(12) United States Patent
Shelton et al.

(10) Patent No.: US 7,839,027 B2
(45) Date of Patent: Nov. 23, 2010

(54) FREQUENCY RESPONSIVE CHARGE SUSTAINING CONTROL OF ELECTRICITY STORAGE SYSTEMS FOR ANCILLARY SERVICES ON AN ELECTRICAL POWER GRID

(75) Inventors: John C. Shelton, Arlington, VA (US);
Praveen Kathpal, Arlington, VA (US)

(73) Assignee: The AES Corporation, Arlington, VA (US)

( * ) Notice: Subject to any disclaimer, the term of this patent is extended or adjusted under 35 U.S.C. 154(b) by 225 days.

(21) Appl. No.: 12/248,106

(22) Filed: Oct. 9, 2008

(65) Prior Publication Data
US 2010/0090532 A1    Apr. 15, 2010

(51) Int. Cl.
H02J 3/24    (2006.01)
H02J 3/28    (2006.01)
(52) U.S. Cl. .................................................. 307/102
(58) Field of Classification Search ............. 307/102; 700/286.291; 702/60, 66
See application file for complete search history.

(56) References Cited
U.S. PATENT DOCUMENTS

| | | | |
|---|---|---|---|
| 4,571,535 A | 2/1986 | Gyugyi | |
| 4,652,770 A | 3/1987 | Kumano | |
| 5,093,630 A | 3/1992 | Sato | |
| 5,270,913 A | 12/1993 | Limpaecher | |
| 5,357,419 A | 10/1994 | Limpaecher | |
| 5,561,597 A | 10/1996 | Limpaecher | |
| 5,604,420 A | 2/1997 | Nambu | |
| 5,907,234 A | 5/1999 | Sadek et al. | |
| 5,929,538 A | 7/1999 | O'Sullivan et al. | |
| 5,977,731 A | 11/1999 | Xia et al. | |
| 6,118,187 A | 9/2000 | Hepner | |

(Continued)

FOREIGN PATENT DOCUMENTS
WO    2007104167 A2    9/2007

OTHER PUBLICATIONS
International Search Report and Written Opinion datd May 27, 2010, and issued in corresponding International Application No. PCT/US2009/005511.

Primary Examiner—Albert W Paladini
(74) Attorney, Agent, or Firm—Buchanan Ingersoll & Rooney PC

(57) ABSTRACT

Systems, apparatus, and methods are provided for maintaining the state of charge of energy storage devices such as batteries, flywheel, capacitors, or other technologies that are energetically coupled with the electricity grid to support ancillary services. To reliably respond to requests to regulate the grid, the charge on the energy storage device is sustained or restored to a specified range in a manner that optimizes the readiness of the energy storage device to supply ancillary services in light of the condition of the grid. A state of charge (SOC) of the energy storage device and the grid frequency may be monitored. When a request from the operator to regulate the grid frequency is not being serviced, the charge of the energy storage device may be increased or decreased so that the charge may be sustained within the specific range. Once the SOC falls outside of the first range, charge may be added to or removed from the energy storage device when the grid frequency has appropriate values, e.g. if the grid frequency is respectively above a first setpoint or below a second setpoint.

24 Claims, 5 Drawing Sheets

U.S. PATENT DOCUMENTS

| | | |
|---|---|---|
| 6,164,057 A | 12/2000 | Rowen et al. |
| 6,486,569 B2 | 11/2002 | Couture |
| 6,738,692 B2 | 5/2004 | Schienbein et al. |
| 6,819,087 B2 | 11/2004 | Delmerico et al. |
| 6,949,843 B2 | 9/2005 | Dubovsky |
| 7,233,843 B2 * | 6/2007 | Budhraja et al. ............ 700/291 |
| 7,239,044 B1 | 7/2007 | Atcitty et al. |
| 7,508,224 B2 * | 3/2009 | Williams .................... 324/707 |
| 7,519,454 B2 * | 4/2009 | Gardner et al. .............. 700/286 |
| 7,571,028 B2 * | 8/2009 | Lapinski et al. ............. 700/286 |
| 2005/0134120 A1 | 6/2005 | Nguyen et al. |
| 2006/0235574 A1 | 10/2006 | Lapinski et al. |
| 2007/0100506 A1 | 5/2007 | Teichmann |
| 2007/0198133 A1 | 8/2007 | Hirst |
| 2007/0241759 A1 | 10/2007 | Williams |
| 2008/0143304 A1 | 6/2008 | Bose et al. |

* cited by examiner

|  | Very High | Slightly High | Set Point | Slightly Low | Very Low |
|---|---|---|---|---|---|
| Above Range | Charge | 0 or Trickle Discharge | 0 or Trickle Discharge | Discharge or 0 | Discharge |
| In Range | Charge | Charge or 0 | 0 | Discharge or 0 | Discharge |
| Below Range | Charge | Charge | 0 or Trickle Charge | 0 or Trickle Charge | Discharge |

(rows: State of Charge; columns: Frequency — with Response and Deadband brackets)

*FIG. 6*

FREQUENCY RESPONSIVE CHARGE SUSTAINING CONTROL OF ELECTRICITY STORAGE SYSTEMS FOR ANCILLARY SERVICES ON AN ELECTRICAL POWER GRID

BACKGROUND OF THE INVENTION

The present disclosure relates to the provision of ancillary services on a power grid, and more specifically to frequency regulation and synchronized reserve using electricity storage systems.

For any given period of time, e.g., one day, electricity grid operators estimate the amount of energy needed for each second, minute, or hour of that period of time. Electricity providers supply this estimated amount of energy via power plants. In general, the average of the actual load is relatively close to the estimated amount. However, there are instantaneous fluctuations in the amount of energy that is required, causing the actual load to be higher than the estimate or lower than the estimate.

In response to such fluctuations, the electricity providers alter the output of electrical power from the power plants in order to match the load. This change in the output of the on-line power plants is termed "load following". When the load is higher than the power being delivered, it is intuitive that the power needs to increase so that electrical devices remain fully operational. FIG. 1 is a plot illustrating an actual load 110 and a load following 120 by the power plants. As can be seen, on-line power plants are not able to exactly match the actual load fluctuations. There is also a second, less intuitive reason that the power needs to equal the load. If the supplied power is different from the power load, the frequency of the AC current supplied to homes and businesses will differ from the nominal standard, e.g. 50 Hz or 60 Hz. This difference in frequency can cause appliances, lighting, and other devices to operate inefficiently, or even in an unsafe manner.

To maintain the required operating frequency of the AC current, power system operators call on power plants to provide an additional service called frequency regulation. In FIG. 1, line 130 illustrates how frequency regulation requires moment by moment adjustments of more and less power to maintain the frequency in the desired operating range. If the load (demand) is lower than the power being supplied, the output frequency increases above 60 Hz. Conversely, if the load is greater than supplied power, the frequency decreases (as the generators slow their energy production). Other similar ancillary services also respond to deviations in the frequency of the power grid, such as synchronized reserve which involves fast response power plants that are already synchronized with the frequency of the grid and can begin supplying energy very quickly in the event of the failure or other problem with the power supply. Services such as frequency regulation and synchronized reserve generally fall into a category referred to as Ancillary Services to the power grid, as these services operate to support the core requirements of providing power and energy for consumption.

Historically, frequency regulation, synchronized reserve and other ancillary services have been provided by power plants. However, energy storage technologies, such as batteries, flywheels, capacitors, or other devices can also be used to supply energy to the electrical power grid. These energy storage technologies, by their nature, also have the capability to take excess energy from the grid to be stored for later use as well as discharge energy to the grid. Since frequency regulation requires constant adjustments of both adding and subtracting the total energy in the system from moment to moment (see FIG. 1, line 130), energy storage technologies are well suited to meeting this need.

Energy storage technologies do not directly create new energy, but allow for an increased efficiency in the use of the energy generated by power plants, by better matching it to the instantaneous change in needs on the power grid. This efficiency will allow for lower total cost and lower emissions in relation to operating the power system. In addition, energy storage technologies supplying ancillary services allows existing power plant energy capabilities to be focused on the production of energy for consumption rather than being diverted to services required to maintain the power grid, potentially delaying the need for new power plants as demand rises over time.

However, most energy storage technologies, when compared to power plants, are constrained in the amount of total energy or duration of energy that can be supplied or withdrawn from the electrical power grid. For example, in the case of battery energy storage systems, the battery may reach a point of being out of energy or completely full of energy and thus unable to perform the regulation function required in that instant. However, given the up and down moment-by-moment fluctuations needed for effective frequency regulation on the power grid, an energy storage unit that is unable to perform one moment, such as the case where the battery is empty and energy is needed, would be able to perform in the next instant, such as the case where the empty battery is now available to absorb excess energy. To meet this challenge, energy storage technologies need mechanisms, process, and controls that enable the most effective charge sustaining operating pattern of the energy storage unit in meeting the needs of frequency regulation and other ancillary services.

Although generic control systems for energy storage technologies connected to a power grid have been proposed, actual systems that can reliably sustain the capability of the system for ancillary services on the power grid have not been achieved. Therefore, it is desirable to have a control system for energy storage systems that can reliably coordinate the state of charge (SOC) or capacity to store or discharge energy of the energy storage system with the moment-by-moment needs of the power grid for frequency regulation, synchronized reserve and other ancillary services. Further, it is desirable that such control system operate to restore the energy storage system to an optimal SOC in a manner that sustains the ongoing capability of the energy storage unit to be able to respond to dispatch or automatic signals for these services.

SUMMARY

Disclosed embodiments provide systems, apparatus, and methods for controlling the charge and discharge behavior of a energy storage systems energetically coupled to the electricity grid such that it provides for sustained availability of charge and discharge capability suitable for frequency regulation and other ancillary services to the power grid when needed, and recovers to a specified level of state of charge (SOC) when not in active use and grid conditions permit. When an operator requests regulation (i.e. adding or removing energy from the grid) by dispatch or through automated control, the control mechanism confirms that the SOC value will allow the requested charge or discharge and then allows the energy storage system to service the request by providing additional energy or absorbing excess energy.

To maintain a proper charge, a state of charge (SOC) value of the energy storage device and the grid frequency are monitored. When a request from the operator to regulate the grid frequency is not being serviced, the charge of the storage device may be increased or decreased so that the charge may be sustained within a specified range. Once the SOC value falls outside of this range, charge is appropriately added to or removed from the storage cells, provided the grid frequency has appropriate values. For example, if the grid frequency is above a first setpoint, then charge may be added, but not if the grid frequency is below the first setpoint. Also, if the grid frequency is below a second setpoint, then charge may be removed, but not if the grid frequency is above the second setpoint.

A better understanding of the principles and advantages of the present invention may be gained with reference to the following detailed description and the accompanying drawings.

BRIEF DESCRIPTION OF THE DRAWINGS

FIG. 6 is a table depicting an example of the respective actions taken for various states of grid frequency and state of charge of the energy storage device.

DETAILED DESCRIPTION

Disclosed embodiments provide systems, apparatus, and methods for maintaining the state of charge (SOC) of an energy storage device that is energetically coupled with the electricity grid to provide ancillary services. As an example, when an operator requests regulation (i.e. adding or removing energy from the grid), a regulation system services the request by providing additional energy from the energy storage device or absorbing excess energy into the energy storage device. In order to reliably respond to subsequent operator requests, the charge on the energy storage device is sustained within a specified range.

Figure 1:
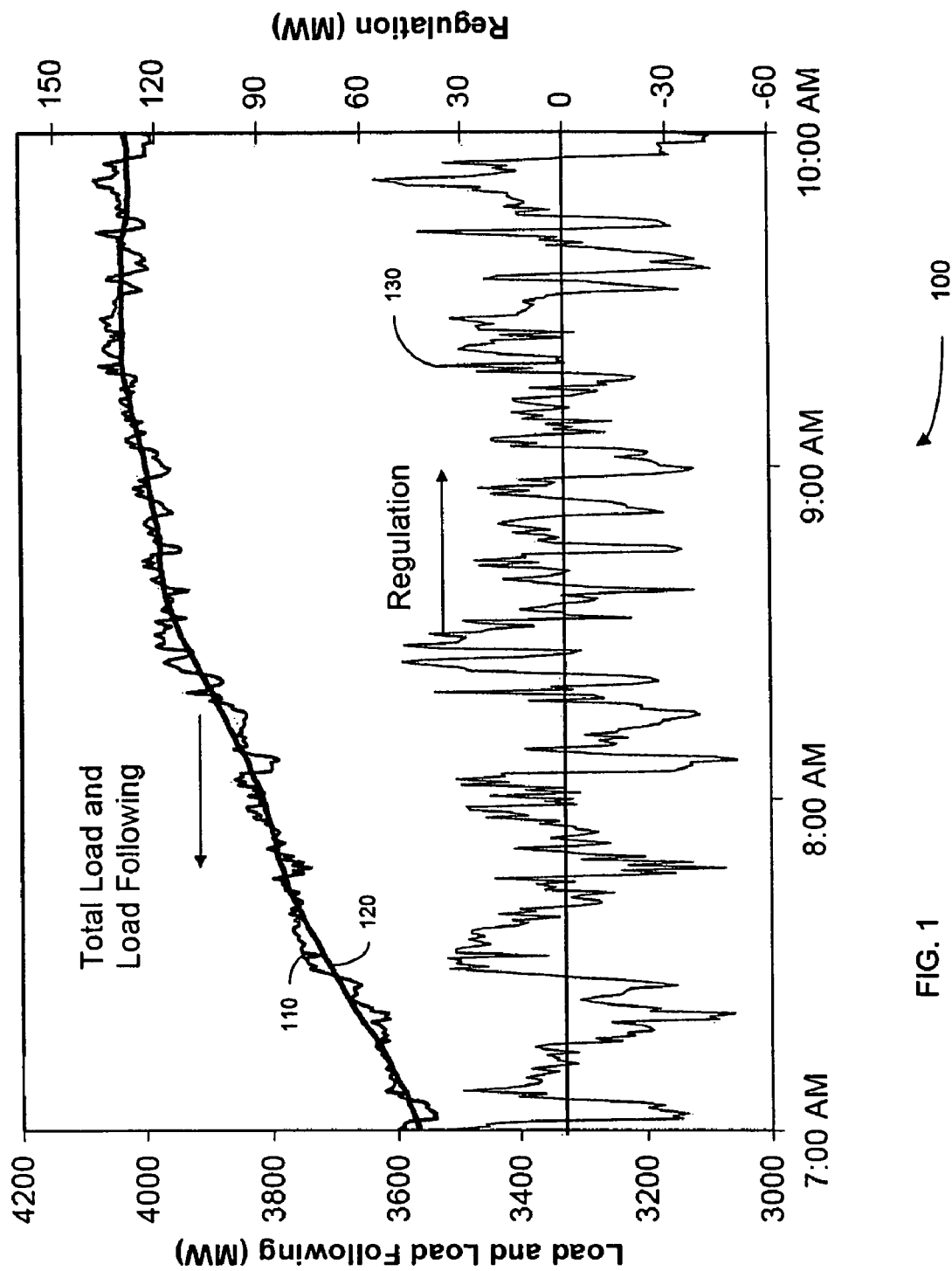
FIG. 1 is a plot illustrating an actual load and a load following, as well as regulation power.
Figure 2:
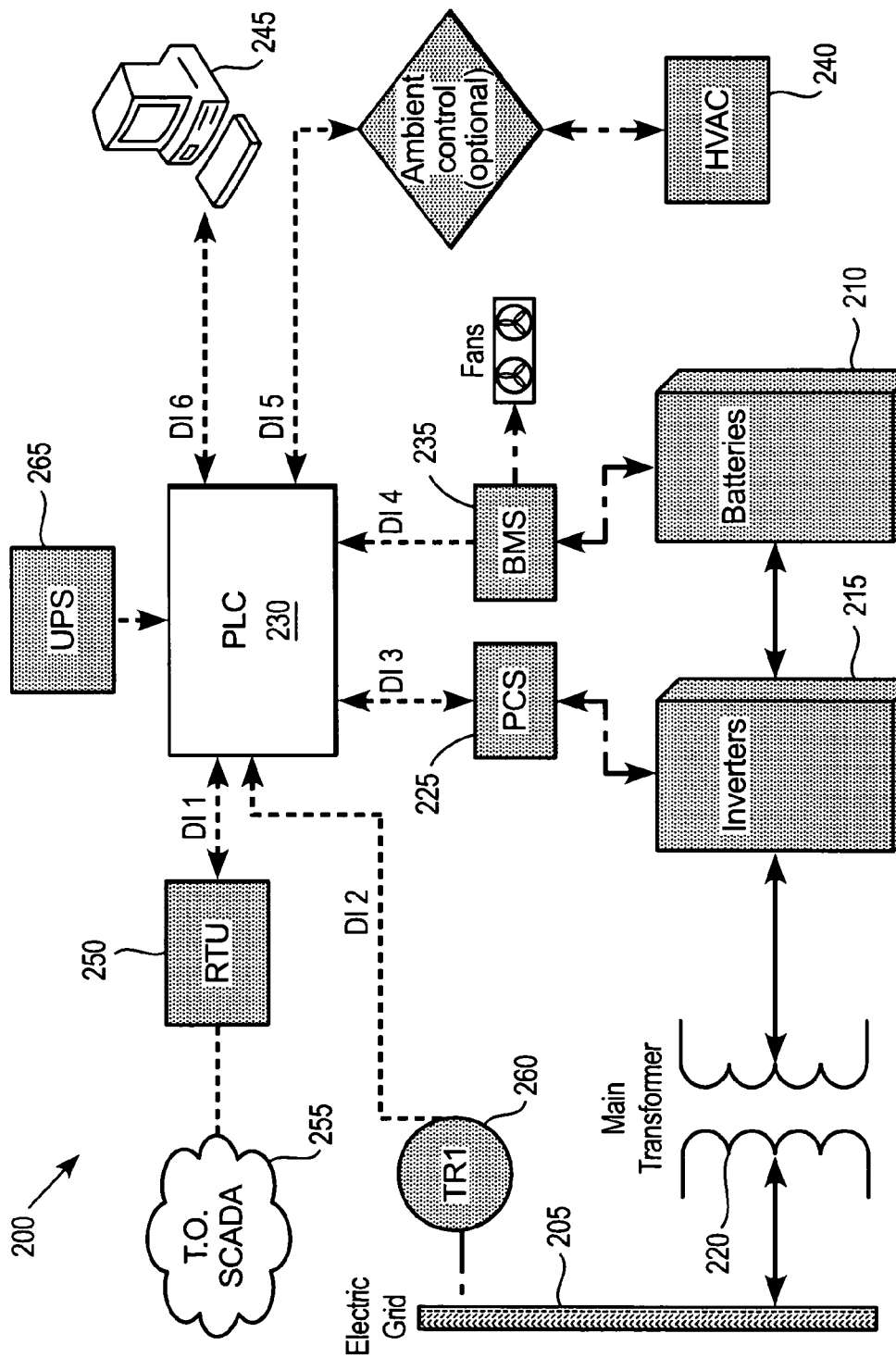
FIG. 2 is a block diagram of an exemplary energy storage system connected to the power grid for ancillary services.

By way of background, and to facilitate an understanding of the principles behind the invention, a frequency regulation unit that employs batteries as energy storage cells will be described as an example of an ancillary service to which the principles of the invention can be applied. It is possible to apply these principles to the management and control other types of energy storage devices such as flywheels, capacitors, and other technologies, in which case the values and setpoints would be adjusted to account for the relevant characteristics of the chosen system. FIG. 2 is a block diagram of a frequency regulation unit 200. The frequency regulation unit 200 provides and receives energy to and from an electricity grid 205. For example, the energy may be provided through a local substation or transmission lines. In this manner, the electricity grid provides an appropriate amount of power for the current load, at a specified nominal frequency, e.g. 60 Hz.

The frequency regulation unit 200 includes a set of energy storage cells 210, such as batteries. In one embodiment, advanced lithium ion batteries are used. The set of energy storage cells, such as batteries 210, is energetically coupled with the electricity grid. As used herein, the term "energetically coupled" means that energy can flow from one object to another. For example, electricity in the form of an AC or DC current can flow from one object to another in a bi-directional fashion. The batteries 210 provide energy to the grid 205 or receive energy from the grid 205, as needed, e.g., to regulate the grid frequency.

When providing energy to the grid 205, a DC current travels from the batteries 210 to bidirectional AC/DC converters 215, which convert the DC current to an AC current. In one embodiment, inverters are used for the DC to AC conversion. When storing energy from the grid, rectifiers are used for AC to DC conversion. Different types of inverters and rectifiers may be used, as will be apparent to one skilled in the art. AC current flows between the converters 215 and the grid 205 via a transformer 220.

A power conversion system (PCS) 225 is a logical control system for the AC/DC bi-directional converters 215. A programmable logic controller (PLC) instructs the PCS 225 to connect or disconnect the converters 215 from the batteries 210 and/or the grid 205. In one embodiment, the connection between the transformer 220 and grid 205 can be by a manual switch, which is normally closed during operation of the system 200.

In one embodiment, the programmable logic controller (PLC) 230 uses program ladder logic to produce real-time control. The PLC 230 sends and receives data signals to the PCS 225 via a data interface (DI) line 3. Example inputs to the PLC 230 from the PCS 225 are a state of readiness signal, and exemplary outputs from the PLC 230 are amount of energy to charge or discharge, and instructions to connect/disconnect the converters 215 to/from the grid 205 and/or batteries 210.

To maintain the batteries in a state that enables them to respond to requests to add energy to or absorb energy from the grid, the system 200 includes a battery management system (BMS) 235. The BMS 235 balances the battery cells 210 and maintains knowledge of a state of charge (SOC) of the cells. The SOC of the batteries 210 is a measurement of the current ability of the batteries to send and receive energy. Example inputs to the PLC 230 from the BMS 235, via DI line 4, are the power capabilities of the batteries 210 (e.g. in MWsec), faults, and the SOC.

In one embodiment, the SOC is a percentage that runs from 0% to 100%, where 100% means that no more energy can be stored in the batteries 210. In one aspect, the SOC is calculated from open circuit and/or closed circuit voltage levels. However, the SOC may be calculated in any number of ways, as known to one skilled in the art.

A remote terminal unit (RTU) 250 may be used to connect to a Supervisory Control And Data Acquisition (SCADA) system 255 via DI line 1. In one embodiment, the SCADA is associated with an operator (e.g. a utility system) that operates the grid 205. Exemplary inputs from the SCADA 255 to the PLC 230 include a request to regulate the grid frequency. The request may include an energy amount (e.g. in MW) to charge or discharge, and could include the grid frequency.

Exemplary outputs from the PLC 230 include a status and availability of the system 200. In one embodiment, PLC 230 could send information to SCADA 255 about the SOC or its capabilities, so that the SCADA 255 knows ahead of time whether or not the system can provide service.

The PLC 230 can also receive data signals over DI line 2 from a transducer 260, which is coupled to the grid 205. The transducer 260 senses the AC signal on the grid 205 to determine the frequency of the electricity being delivered over the grid.

In one implementation, an uninterruptible power supply (UPS) 265 supplies power to the PLC 230. In another embodiment, the PLC 230 sends and receives signals (via DI line 5)

from an HVAC unit 240 to maintain proper environmental conditions for the batteries 210 and other components. Example inputs to the PLC 230 from the HVAC 240 are temperature and humidity, and an example output to the HVAC is a thermostat setting.

In yet another implementation, a computer 245 is connected to the PLC 230 for controlling, programming, or setting parameters of the PLC 230. The computer 245 may also be used to monitor the system 200. Example inputs from the computer 245 to the PLC 230 are shut-down and start-up signals. Example outputs to the computer 245 are log events, log data, and reports of alerts.

When frequency regulation is being performed, a request may be received at PLC 230 from the operator of the electricity grid through SCADA 255 and RTU 250. The request can include instructions to absorb energy from or add energy to the electricity grid. In one embodiment, the request specifies how much energy to transfer or a rate for the transfer. In response, energy is transferred to/from the grid, depending on whether the request is to increase or decrease the current grid frequency, or equivalently to absorb or add energy.

Thereafter, the regulation may be stopped in response to another dispatch request from the operator. For example, the operator may deem that the grid frequency is at or near the desired nominal frequency. The operator may also deem that the frequency is not likely to change soon, for example, because the operator may forecast that the energy generation by online plants will match the expected load. In another example, the regulation may be stopped based on a measurement by system 200 that the grid frequency is at or near the desired value. The regulation may also be stopped for other reasons, such as detecting a fault.

During the regulation, the SOC of the batteries may rise or fall dramatically. For example, the batteries may have transmitted a significant amount of energy to the grid, thus leaving the batteries with very little charge (e.g. an SOC of about 20%). In another example, the batteries may have received a lot of energy from the grid, thus leaving the batteries with a high amount of charge (e.g. an SOC of about 85%). In both of these instances, the batteries are in a poor condition to continue to regulate the grid frequency if more energy needs to be respectively added or absorbed. Thus, to provide a more reliable service, the charge on the batteries is modified in accordance with the principles of the invention, to maintain it within a desirable range for the greatest amount of time possible.

The modification may be to increase or decrease the charge, as appropriate. The modification only occurs when it is beneficial to do so, to balance the need for an appropriate SOC with the overall needs of the power distribution system. In accordance with one implementation, the modification is carried out while the grid frequency is in a deadband that requires no regulation. During this time, charge may be added/removed until the SOC value, which may be monitored at the PLC 230 based on information from the BMS 230, is within a specified range. For example, the range may be centered around 50% so that the system 200 can equally provide or receive energy. In other embodiments, the target state may be higher or lower than about 50%, for example, when it is known that a large transfer in a specific direction is likely.

Figure 3:
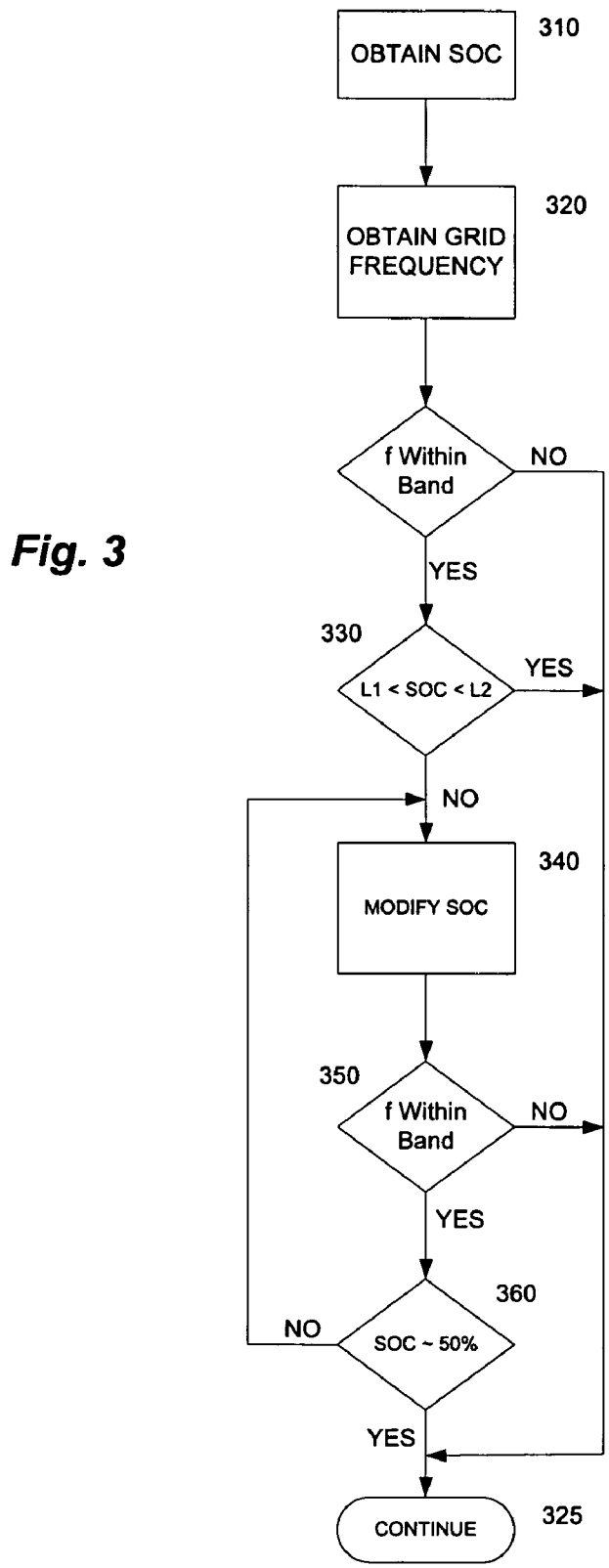
FIG. 3 is a flowchart illustrating a method of sustaining a specified range of charge on the energy storage system that is used to regulate an operating frequency of an electricity grid.

FIG. 3 is a flowchart illustrating a general method of sustaining a specified range of charge on batteries that are used to regulate an operating frequency of an electricity grid during the time that the system 200 is not adding or absorbing power to provide frequency regulation. In step 310, the current SOC value is obtained. For example, the PLC 230 may receive the SOC from the BMS 235. In one embodiment, the SOC value is monitored on a periodic basis.

In step 320, a measurement of the grid frequency is obtained. For example, the PLC 230 may receive the measured grid frequency from the transducer 260 on a periodic basis. The received frequency is checked to determine whether it is within an established deadband. For example, a determination might be made whether it is within the range of 60 Hz±0.025 Hz. This range can be the same as the range that the operator uses to determine when a request to system 200 for frequency regulation is warranted, or it can be different. For example, a request for regulation might be made only when the instantaneous operating frequency is outside a range of 60 Hz±0.05 Hz.

If the instantaneous grid frequency is outside of the deadband, then adjustment of the SOC is not appropriate, since a transfer of energy to the grid when the frequency is high, or from the grid when the frequency is low, may cause a need for regulation itself. In this case, the process of FIG. 3 terminates and the PLC continues on to other tasks at step 325.

However, if the grid frequency is within the deadband, a determination is made at step 330 whether the SOC is outside a sustain range defined by desired upper and lower limits L1 and L2. In one implementation, L1 could be equal to 45% of full battery capacity, and L2 could be equal to 55% of capacity. In step 340, the charge is modified if the SOC is outside of the sustain range, but the grid frequency is within the deadband, as explained in greater detail hereinafter. For example, if it is determined that it is desirable to have the SOC in a range between about 45%-55%, then the charge may be modified for an SOC of about 35%. In such a case, the SOC is modified by transferring energy from the grid to the storage cells. If the SOC is determined to be within the sustain range at step 330, no transfer of energy occurs between the grid and the storage cells, and the process continues at step 325.

During the modification of the charge, the grid frequency is continuously monitored to determine if it has moved out of the deadband, at step 350. If this occurs, the system 200 stops the charging and continues at step 325. If the grid frequency remains within the deadband, the process moves on to step 360.

In step 360, a determination is made whether the SOC value has returned to an acceptable value. In one embodiment, the acceptable range is the same range that is used to determine whether the charge needs to be modified in step 330. In another embodiment, the acceptable range is smaller. For example, the charge may be modified until the SOC is at or close to 50%. Otherwise, the SOC value may hover near one end of the range, and require charge modification repeatedly. If the SOC has not attained an acceptable value, steps 340-360 are repeated. Once the SOC has been determined to be at an acceptable level at step 360, the system 200 stops the charging process and continues at step 325.

The process illustrated in FIG. 3 can be initiated in a number of different ways. In one implementation, the PLC 230 can directly monitor the frequency of the grid power, via the transducer 260, to determine when the frequency is within the established deadband. When this condition is detected, the PLC can initiate the process of FIG. 3, to assess whether the SOC of the storage cells needs to be modified, and if so proceed with the modification.

In another implementation, the PLC can interpret instructions that are received from the system operator to determine whether the operating frequency is in the deadband. For instance, if the instructions to certain electricity providers are to add or absorb energy at a relatively low rate of transfer, other provides who are not being asked to do so at that time might infer that the operating frequency is quite near the nominal frequency, and thereby initiate the process of FIG. 3.

As a third possibility, the system operator itself could send out status information to indicate when the operating frequency is in the deadband, or send an explicit instruction to initiate an SOC maintenance procedure.

Figure 4:
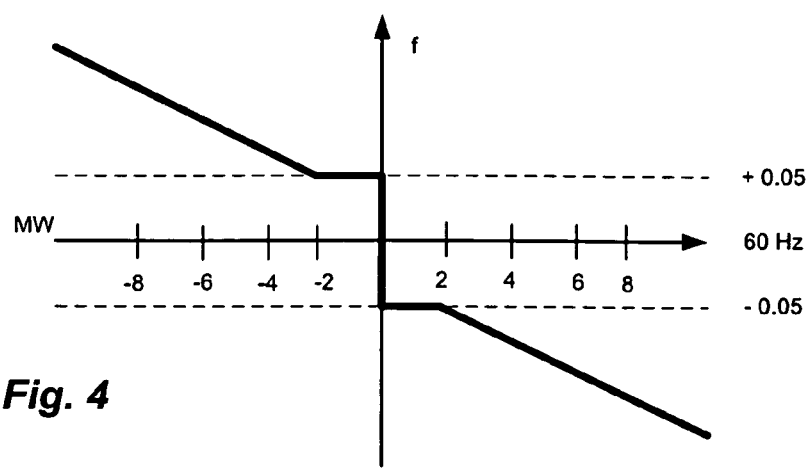
FIG. 4 is a graph depicting a linear response to frequency deviations on the power grid.

The particular processes for regulating the frequency of the grid and for adjusting the SOC of the storage cells will now be described in greater detail with reference to FIGS. 4 and 5. FIG. 4 is a graph illustrating one embodiment of the operation of the system to regulate the frequency of the grid. The vertical axis represents the detected frequency of the grid in Hertz, and the horizontal axis depicts the amount of energy transferred between the storage cells and the grid, in megawatts. In the example of FIG. 4, 60 Hz is used as the nominal grid frequency. The area between the dashed lines in the chart of FIG. 4 represents a response range in which fluctuations of the grid frequency around the nominal value are tolerated without the need to regulate. In the illustrated example, the deadband is 60 Hz±0.05 Hz. It will be appreciated that the frequency encompassed by the deadband can be greater or smaller that the range of 0.10 Hz depicted in this example.

When the instantaneous frequency of the grid lies within the acceptable range, no regulation takes place, i.e. the converters 215 are instructed to open the connection between the grid 205 and the storage cells 210, so that no energy is transferred between them. Once the frequency passes outside this range, the converters are activated to transfer energy, in a direction corresponding to whether the frequency is above or below the nominal value. In the example of FIG. 4, positive values on the horizontal axis represent the transfer of energy from the storage cells to the grid. Thus, once the frequency falls below the nominal value of 60 Hz by more than 0.05 Hz, the inverters are activated to convert DC current from the storage cells into AC current and supply it to the grid. Conversely, if the frequency exceeds the nominal value by more than the acceptable tolerance, the rectifiers are activated to convert power from the grid into DC current and supply it to the storage cells.

In the example of FIG. 4, the amount of energy transferred to or from the grid is linearly proportional to the amount by which the instantaneous grid frequency deviates from the nominal frequency. However, other functions can also be employed for the relationship between the frequency deviation and the amount of energy transferred, such as a higher-order polynomial that passes through the origin of the graph.

Figure 5A:
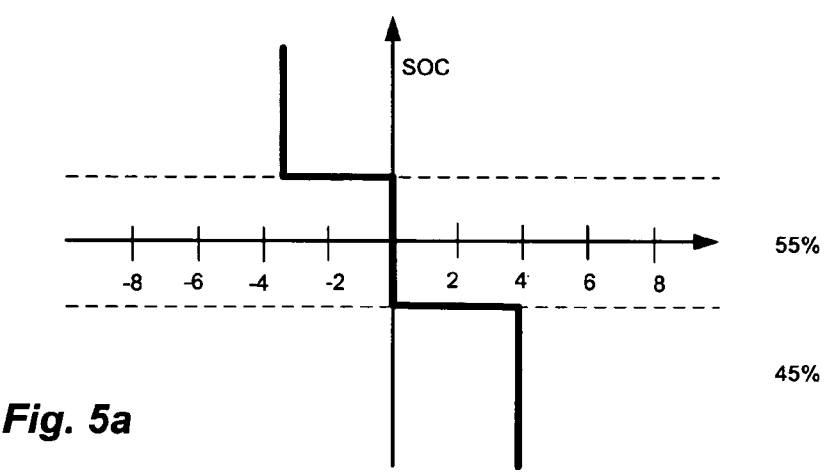
FIGS. 5a and 5b are graphs illustrating two examples of charge maintenance for the energy storage device.
Figure 5B:
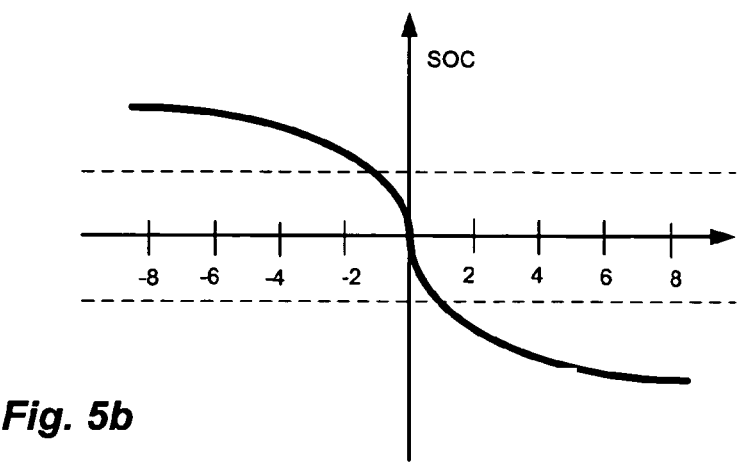

FIGS. 5a and 5b are graphs illustrating two examples of operations for sustaining the SOC of the storage cells in accordance with the principles of the invention. In these graphs, the vertical axis represents the SOC of the cells. As discussed previously, this operation only occurs while the instantaneous frequency lies within the deadband. In the example of FIG. 5a, a step function is employed, such that a fixed rate of energy is transferred to or from the grid while the storage cells are being discharged or charged, respectively. In the illustrated example, the charging and discharging transfer only takes place while the SOC is outside the sustain range. Once the SOC decreases to the upper limit, e.g. 55%, or increases to the lower limit, e.g. 45%, the transfer rate switches to 0 MW. As discussed previously, however, once charging or discharging is initiated when the SOC is outside the range, it can continue until such time as the SOC reaches a value of 50%, or close thereto.

In the example of FIG. 5b, the rate of transfer is a function of the state of charge. In this case, a third-order polynomial is employed to determine the amount of energy to be transferred in accordance with the SOC. Higher-ordered polynomials can be employed as well.

Other factors can be employed to determine the rate of charge or discharge of the storage cells. For instance, rather than the state of charge, the transfer rate might be a function of the frequency of the grid within the deadband. As another example, the rate of charge might be attenuated in accordance with the market share of the electricity provider. This can be done to avoid the possibility that a provider with a large market share, and hence a large amount of storage capacity, would adversely affect the overall state of the grid by presenting too large a load while charging its storage cells, or adding too much energy to the grid when discharging its storage cells.

The table of FIG. 6 provides an example of the operations that are carried out to provide ancillary services on the electrical grid and maintain the SOC of the storage cells that are used to support such services. The rows of the table correspond to three respective ranges of the SOC, namely above the upper limit L2 (above range), between the limits L1 and L2 (in range), and below the lower limit L1 (below range). The columns of the table depict different respective ranges for the grid frequency, relative to the nominal set point, e.g. 60 Hz.

The cells of the table with darker shading indicate actions that are taken in response to a formula or a command dispatched from a service operator. The lighter shading indicates actions that are taken to provide charge maintenance. When the instantaneous frequency is Very Low or Very High, i.e. outside of the deadband, the action taken is the discharge the storage cells onto the grid, or charge the storage cells from the grid, respectively, assuming the storage cells have adequate capacity to perform the required action. When the frequency is within the deadband, but not at the set point, the action to be performed is dependent upon the frequency and the SOC. If the frequency is below the set point, the storage cells are discharged when the SOC is above range and provided with a trickle charge when the SOC is below range. If the frequency is above the set point, the storage cells are provided with a trickle discharge when the SOC is above range and charged when the SOC is below range.

The specific details of the specific aspects of the present invention may be combined in any suitable manner without departing from the spirit and scope of embodiments of the invention. However, other embodiments of the invention may be directed to specific embodiments relating to each individual aspects, or specific combinations of these individual aspects.

For instance, the foregoing examples have been described in the context of frequency regulation, in which power is added to or absorbed from the grid for purposes of load following. In this situation, the decision to add or absorb power is based upon the instantaneous value of the operating frequency relative to established threshold values, e.g. the deadband limits. The principles described herein are equally applicable to other ancillary services that respond to changes in the operating frequency of the grid. For example, to respond to a rapid drop in the operating frequency, a parameter such as the rate of change of the frequency could be employed in addition to, or in lieu of, the instantaneous value of the operating frequency, as a trigger for an instruction to add power to the grid. Within different applications for ancillary services, the set points of the device would be modified for that service using the same control and logic structure described for frequency regulation.

It will be understood that the present invention as described above can be implemented in the form of control logic using hardware and/or using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage devices.

The above description of exemplary embodiments have been presented for the purposes of illustration and description. They are not intended to be exhaustive or to limit the invention to the precise form described, and many modifications and variations are possible in light of the foregoing teachings. The embodiments are described to explain the principles of the invention and its practical applications to thereby enable others skilled in the art to utilize the invention in various embodiments and with various modifications as are suited to the particular use contemplated.

What is claimed is:

1. A method of responding to changes in the operating frequency of an electricity grid by means of energy storage devices that are energetically coupled with the electricity grid, the method comprising:
   determining whether the operating frequency of the electricity grid is within a predetermined range of a nominal operating frequency;
   if the operating frequency is determined to be outside said range, regulating the grid frequency by transferring energy between the energy storage device and the electricity grid;
   if the operating frequency is within said range, determining whether a state of charge (SOC) of the energy storage device is within predetermined limits; and
   transferring energy between the energy storage device and the electricity grid to bring the SOC within said predetermined limits when the operating frequency is within said range and the SOC of the energy storage device is outside said predetermined limits.

2. The method of claim 1, further comprising:
   monitoring the state of charge (SOC) with an energy storage device management system from which an SOC value is received; and
   monitoring the grid frequency with a transducer from which the grid frequency is received, wherein the SOC value and the grid frequency are received at a programmable logic control.

3. The method of claim 1, wherein energy is transferred between the grid and the energy storage device to regulate the frequency at a rate that is based upon the operating frequency of the grid.

4. The method of claim 3, wherein said rate is a linear function of the operating frequency of the grid.

5. The method of claim 3, wherein said rate is a non-linear function of the operating frequency of the grid.

6. The method of claim 5, wherein said non-linear function is a polynomial of an order higher than one.

7. The method of claim 1, wherein energy is transferred between the grid and the energy storage device to bring the SOC within said predetermined limit at a rate that is based upon the SOC.

8. The method of claim 1, wherein energy is transferred between the grid and the energy storage device to bring the SOC within said predetermined limit at a rate that is based upon the operating frequency of the grid.

9. The method of claim 1, wherein energy is transferred between the grid and the storage cells to bring the SOC within said predetermined limit at a rate that is based upon the capacity of the energy storage device.

10. A method of responding to changes in the operating frequency of an electricity grid by means of energy storage devices that are energetically coupled with the electricity grid, the method comprising:
    determining whether a parameter of the operating frequency of the electricity grid is within a predetermined range;
    if the operating frequency parameter is determined to be outside said range, adjusting the grid frequency by transferring energy between the energy storage devices and the electricity grid;
    if the operating frequency is within said range, determining whether a state of charge (SOC) of the energy storage devices is within predetermined limits and whether the operating frequency is within a predetermined band around a nominal operating frequency; and
    transferring energy between the energy storage device and the electricity grid to bring the SOC within said predetermined limits when the operating frequency is within said predetermined band and the SOC of the energy storage device is outside said predetermined limits.

11. The method of claim 10, wherein said parameter is the instantaneous value of the operating frequency.

12. The method of claim 11, wherein said predetermined band is equal to said predetermined range.

13. The method of claim 11, wherein said predetermined band is smaller than said predetermined range.

14. The method of claim 10, wherein said parameter is the rate of change of the operating frequency.

15. A system for responding to changes in the operating frequency of an electricity distribution grid, comprising:
    a least one energy storage device;
    a converter that, in response to a command to add energy to or absorb energy from the grid, selectively couples said storage cell to the grid to transfer energy between the energy storage device and the grid; and
    a state-of-change (SOC) maintenance system that determines whether the operating frequency of the electricity grid is within a predetermined range of a nominal operating frequency, determines whether the SOC of the energy storage device is within predetermined limits, and controls said converter transfer energy between the energy storage device and the electricity grid to bring the SOC within said predetermined limits when the operating frequency is within said range and the SOC of the energy storage device is outside said predetermined limits.

16. The system of claim 15, wherein said SOC maintenance system includes a transducer that provides data pertaining to the operating frequency of the grid.

17. The system of claim 15, wherein said SOC maintenance system includes a controller that instructs the converter to connect and disconnect the energy storage device and the grid.

18. The system of claim 17, wherein said controller instructs the converter to transfer energy at a designated rate.

19. The system of claim 18, wherein the controller instructs the converter to transfer energy between the grid and the energy storage device at a rate that is based upon the SOC.

20. The system of claim 18, wherein the controller instructs the converter to transfer energy between the grid and the energy storage device at a rate that is based upon the operating frequency of the grid.

21. The system of claim 20, wherein said rate is a non-linear function of the operating frequency of the grid.

22. The system of claim 21, wherein said non-linear function is a polynomial of an order higher than one.

23. The system of claim 18, wherein the controller instructs the converter to transfer energy between the grid and the energy storage device at a rate that is based upon the capacity of the energy storage device.

24. The system of claim 17, further including a storage cell management system that provides data to the controller pertaining to the state of charge of the energy storage device.

* * * * *